Patented July 18, 1950

2,515,265

UNITED STATES PATENT OFFICE 2,515,265

EXTRACTION OF PLASTICS FROM LINOLEUM CEMENT

Harold A. Reehling, Lancaster, Pa., assignor to Armstrong Cork Company, Lancaster, Pa., a corporation of Pennsylvania No Drawing. Application January 8, 1947, Serial No. 720,938

5 Claims. (Cl. 106—228)

This invention relates to plastic compositions. More particularly, this invention relates to the extraction of plastic material from linoleum cement and to plastic compositions containing as an essential ingredient the residue remaining after solvent extraction of linoleum cement.

The product known as linoleum is generally prepared by calendering or otherwise impressing a mass of plastic material upon a suitable backing such as burlap or similar woven fabric. This plastic mass, known to the art as linoleum mix, is obtained by admixing a binder, known to the art as linoleum cement, with mineral and organic fillers, coloring pigment, and other ingredients.

Linoleum cements are produced by heating a drying oil, generally linseed oil, and combining the drying oil with a resin, generally rosin. One widely employed method of manufacturing linoleum cement comprises agitating a mixture of drying oil and a resin while supplying a continuous stream of air to the mixture during agitation thereof. This cement is referred to as "mechanical cement" in that the apparatus employed in its manufacture is a mechanical oxidizer. The oxidation of the oil in the presence of the resin is carried out at elevated temperatures and for a period of time which is generally 20 to 30 hours. Such a period of time, when employed at the temperatures generally used, which are in the order of 160° F. to 260° F., results in a substantially complete oxidation and polymerization of the oil resin mixture.

In order to ascertain the quality of a linoleum cement, numerous methods of analysis have been developed. One widely employed method of chemically evaluating linoleum cements comprises the separation of the constituents of the cement into three fractions by solvent extraction. The finished cement is first subjected to the solvent action of petroleum ether boiling in the range of 30° C. to 75° C. to separate from the cement that portion thereof which is comprised chiefly of the unoxidized and nonhardening constituents of the oxidized drying oil, including unoxidized glycerides of linoleic and linolenic acids, unoxidizable and nonhardening glycerides of saturated fatty acids, and oxidized but nonhardening glycerides such as oxidized glycerides of oleic acid. The expression "nonhardening" is employed as indicative of the property of attaining fluidity even when exposed to heat for long periods of time. After removal of the petroleum ether soluble portion, the remaining portion of the cement is subjected to the action of ethyl ether to remove that portion thereof which is comprised chiefly of the oxidized but uncoagulated linoleic and linolenic glycerides of the drying oil which are capable of hardening without further substantial oxidation. The residue which is neither soluble in petroleum ether nor ethyl ether is comprised chiefly of the completely oxidized and polymerized portion of the cement.

Numerous processes have been devised for altering the above fractions with a view to the production of useful products therefrom. For example, one method heretofore proposed involves stopping the oxidation of the resin oil mixture before or at the point of formation of the material which is insoluble in petroleum ether and ethyl ether. In other words, the formation of an insoluble residue comprised chiefly of completely polymerized and oxidized material is avoided. This method results in the formation of a mixture comprised preponderantly of the petroleum ether soluble fraction and the ethyl ether soluble fraction. Cements prepared in accordance with this method have been suggested for use not only as the binder in a linoleum mix but also as the basic ingredient of various coating compositions.

I have found that the completely oxidized and polymerized portion of the resin-oil complex known to the art as a linoleum cement may be employed in the manufacture of molded articles of varying characteristics by mixing therewith a suitable filler and subjecting the resulting product to heat and pressure.

It is, accordingly, an object of this invention to provide a plastic composition comprising a portion of the resin-oil complex known as linoleum cement.

It is a further object of this invention to provide a molding composition comprising the completely oxidized and polymerized portion of linoleum cement and a filler.

Still another object of this invention is to provide a method of obtaining a plastic material from linoleum cement.

These and other objects of this invention will become apparent to those skilled in the art upon becoming familiar with the following description.

In one embodiment of my invention, a mixture of a drying oil, such as linseed oil, soya bean oil, China-wood oil, and the like, and a resin, such as rosin, kauri gum, ester gum, and the like, is heated at an elevated temperature in a device known to the art as a mechanical oxidizer which comprises a container having ports for the admittance of air therethrough and provided with a plurality of paddles. While agitating the resin-oil mixture at an elevated temperature, such as 160° F. to 260° F., a current of air or other oxygen-containing gas is passed therethrough. The oxidation is carried on in this manner until oxidation and polymerization of the resin-oil mixture is substantially complete. Such a state is reached after about 20 to 30 hours at elevated temperatures.

The resulting natural resin-siccative oil complex or linoleum cement is withdrawn from the oxidizer and transferred while hot, that is at a temperature of 220° F. to 240° F., to a suitable mixing device and therein is admixed with organic or inorganic fillers. Examples of organic fillers which may be admixed with the linoleum cement in accordance with my invention are cork, wood flour, saw dust, or the like. Suitable inorganic fillers are asbestos, whiting, China clay, and the like. The amount of filler added to the linoleum cement at this stage of my invention varies depending upon the type of filler, its surface area, and the product desired. Generally speaking, it is particularly advantageous to incorporate from about 20% to about 50% by weight of filler into the cement which, at this stage of the process, is in a highly plastic condition, thereby enabling ready incorporation of filler therewith.

After incorporation of filler into the cement, the resulting mixture is extracted with petroleum ether or similar volatile petroleum hydrocarbon in a suitable extraction apparatus. A particularly advantageous method of effecting this extraction is that involving passing the solvent through the cement filler mixture and returning the solvent to a reservoir from which it may be distilled, condensed, and recycled for further use. The extract from the cement remains in the reservoir and may be conveniently withdrawn after extraction of the cement by the petroleum ether has been completed. This extract is an oily material and has a specific gravity of approximately 1.008. This extract is comprised of the unoxidized and unpolymerized portion of the oil content of the cement. Generally speaking, this extract amounts to about 20% to 30% by weight of the original cement.

Following the extraction with petroleum ether, the balance of the cement and the filler are extracted with ethyl ether or similar ethers. The extraction may be carried out in a manner similar to that employed in obtaining the petroleum ether extract. This ethyl ether extract is a clear, amber-colored, sticky material which has a specific gravity of 1.052 and is comprised chiefly of dimers formed from oxidation and polymerization of the drying oil content of the cement. This extract is heat convertible and may be changed under heat, for example, 170° F. to 200° F., into a flexible, tough film. Generally speaking, this extract amounts to about 25% to 35% by weight of the original cement.

The residue remaining after the petroleum ether extraction and the ethyl ether extraction is dried and may be subjected to heat and pressure to obtain a hard material of desired shape which is characterized by excellent alkali and solvent resistance. This residue is comprised of the filler and a long polymer resin having a specific gravity of 1.11 and a softening point in the range of 50° C. to 80° C. Generally speaking, this fraction amounts to about 30% to 50% of the original cement. The residue and filler may be micro-pulverized and molded under heat and pressure into any desired shape. The resulting molded material has high resistance to solvents and alkalis.

I have found that admixture of cement and filler before extraction greatly improves the yield and character of each of the three fractions of linoleum cement. While I do not intend to be limited by any theory advanced herein, admixing of filler with hot plastic cement prior to extraction enables substantially complete fractionation by the various solvents employed for extraction in that the cement surfaces are much larger and thus a larger surface area is exposed to the solvent.

The extraction is advantageously effected by means of petroleum ether boiling in the range of 30° C. to 75° C. and ethyl ether. However, similarly, boiling hydrocarbon solvents, such as pentane, hexane, and the like may be employed in lieu of petroleum ether or mixtures of such solvents may be employed. Likewise, other ethers, such as propyl ether, isopropyl ether, and the like or mixtures thereof may be substituted for the ethyl ether in the extraction of linoleum cement in accordance with my invention. Generally speaking, the first stage of the extraction is advantageously effected by means of a hydrocarbon solvent, and the second stage of the extraction is effected by means of an ether.

The invention may be more readily understood by reference to the following specific examples which are indicative of compositions which may be prepared from the linoleum cement extract made in accordance with my invention.

Example I

A linoleum cement was prepared by oxidizing a mixture of linseed oil and rosin in a mechanical oxidizer for about 30 hours at a temperature of about 200° F. The resulting resin-oil complex was withdrawn from the oxidizer and while hot and in a fluid state, was admixed with 40% by weight of wood flour. The cement-wood flour mixture containing 60% by weight of cement and 40% by weight of wood flour was subjected to petroleum ether extraction followed by ethyl ether extraction, to give a residue comprised of the long chain polymers of linoleum cement and wood flour. This residue was compressed under 1400 pounds pressure at a temperature of 180° F. to give a product having a specific gravity of 1.25. Before stoving, this product was subjected to a 200 pound load having a .282" tip for 30 seconds which resulted in an indentation of 3%. After stoving for ten days, at 190° F., the product was subjected to a 200 pound load with a .282" tip for 30 seconds to give a 2.3% indentation.

Example II

A linoleum cement prepared by the method described in Example I, was mixed while hot with sufficient 50-dust cork particles to give a mixture having 50% by weight linoleum cement and 50% by weight cork particles. The resulting cement-cork mixture was subjected to petroleum ether extraction followed by ethyl ether extraction. The residue remaining after this extraction was subjected to 6000 pounds pressure at a temperature of 250° F. to obtain a product having a specific gravity of 1.17. This product was subjected to a 200 pound load having a .282" tip for 30 seconds. This resulted in an indentation of 14.6%.

Example III

A linoleum cement was prepared by the method described in Example I. This cement was admixed while hot and in a fluid state with sufficient pine saw dust to obtain a mixture comprised of 35% by weight pine saw dust and 65% by weight linoleum cement. This mixture was extracted with petroleum ether and ethyl ether, and the residue was compressed under 6000 pounds pressure at a temperature of 250° F. to obtain a product having a specific gravity of 1.26. This product was subjected to a 250 pound load having a .178" tip for 30 seconds. This resulted in a 5.1% indentation.

Example IV

A linoleum cement was prepared by the method described in Example I. The cement, while hot and in a highly fluid state, was admixed with sufficient whiting and wood flour to give a composition comprising 45° whiting, 22% wood flour, and 33% linoleum cement. The resulting mixture was extracted with petroleum ether and ethyl ether, and the residue was compressed under 6000 pounds pressure at a temperature of 250° F. to give a product having a specific gravity of 1.73. This produce was subjected to a 250 pound load having a .178" tip for 30 seconds. Under this pressure, 3.9% indentation was obtained.

Example V

A linoleum cement prepared in accordance with Example I was admixed while hot and in a highly fluid state with sufficient asbestos fiber to obtain a product comprising 70% asbestos fiber and 30% linoleum cement. The resulting mixture was extracted with petroleum ether and ethyl ether, and the residue obtained was compressed under 6000 pounds pressure at a temperature of 250° F. The resulting product had a specific gravity of 1.85. This product was subjected to a 400 pound load having a .113" tip for 30 seconds and resulted in 22% indentation.

Example VI

A linoleum cement prepared in accordance with Example I was admixed while hot and in a highly plastic condition with sufficient cellulose fiber to give a product comprising 43% cellulose fiber and 57% linoleum cement. The resulting mixture was extracted with petroleum ether and ethyl ether, and the residue remaining from this extraction was compressed under 6000 pounds pressure at a temperature of 250° F. to obtain a product having a specific gravity of 1.28. This product was subjected to a 250 pound load with a .178" tip for 30 seconds. After application of this load for the described period, 8.7% indentation was obtained.

The above examples indicate the highly desirable characteristics obtained by the practice of my invention. In the test described in each of the examples, the comparatively small diameter of the load tip makes the load equivalent to extremely high pressures and, in each instance, comparatively small percentage indentation was observed. In order to compare the characteristics of the product of my invention which is obtained by molding the residue from solvent extraction of a linoleum cement containing filler, with the product obtained without solvent extraction, similar tests were made on a composition comprising 60% linoleum cement prepared in accordance with the method of Example I and 40% wood flour. No extraction was made and the mixture was compressed under 14,000 pounds pressure at a temperature of 180° F. to give a product having a specific gravity of 1.08. Before stoving, this product was incapable of being subjected to the indentation tests recited in the examples. After stoving ten days at 190° F., the product exhibited 23% indentation after being subjected to a 50 pound load with a .282" tip for 30 seconds. In contrast to this, the product of Example I exhibited less penetration before stoving with a greater load and the difference between the results obtained before and after stoving may be considered to be so small as to be insignificant.

A similar test was made upon a fraction of linoleum cement prepared by admixing 60% of the linoleum cement made in accordance with Example I and 40% wood flour. This mixture was then subjected to petroleum ether extraction and the residue from the extraction comprised dimers and long chain polymers together with wood flour. This residue was compressed under 14,000 pounds pressure at a temperature of 180° F. to give a product having a specific gravity of 1.15. Before stoving, this product, when subjected to a 100 pound load with a .282" tip for 30 seconds, showed 2.5% indentation, in contrast to the results of the tests made upon the product of Example I, wherein only 3% indentation was obtained with a load twice as great as that employed in testing the product prepared from the residue made from petroleum ether extraction. After stoving for ten days at 190 F., the product prepared from the residue from petroleum ether extraction, when subjected to a 200 pound load with a .282" tip for 30 seconds, exhibited 11.5% indentation which was substantially four times greater than that exhibited by the plastic composition of Example I prior to stoving.

While I have described my invention with particular reference to an advantageous modification involving the extraction of a linoleum cement obtained by oxidizing a mixture of a siccative oil such as a drying oil, for example, linseed oil, China-wood oil, and the like, or a semi-drying oil such as soya bean oil, and a natural resin, such as rosin, at elevated temperature, the extraction may be performed in connection with the cements prepared by heating a siccative oil in the presence of other resinous material such as various synthetic resins for example, phenol formaldehyde resins, vinyl resins, such as polyvinyl chloride and copolymers of vinyl chloride with vinyl acetate, polystyrene resins, coumarone indene resins, and the like. Such synthetic resins may be substituted for all or part of the natural resin component of the mixture subjected to oxidation at elevated temperature to obtain linoleum cement. Thus, the invention, in its broad aspects may be considered to relate to the extraction of an oxidized and polymerized siccative oil-resin complex. Advantageously, the invention is concerned with the extraction of an oxidized and polymerized siccative oil-natural resin complex.

The residue from the extraction process described herein may be employed, for example, as a reinforcing filler in the manufacture of linoleum, as a binder for cork in the manufacture of cork compositions, as a binder for asphalt tile, and in other similar applications. The particular use to which the residue is to be put will govern the type of filler with which the oxidized and polymerized siccative oil-resin complex is admixed prior to the extraction.

In order to obtain molded articles, the residue-filler mixture prepared in accordance with my invention may be molded by any method known to the art.

While my invention has been described with reference to certain specific examples and with reference to certain particular embodiments, it is to be understood that the invention is not limited thereby. Therefore, changes, omissions, additions and/or substitutions may be made without departing from the spirit of the invention as defined in the appended claims which are intended to be limited only as required by the prior art.

I claim:

1. A method of fractionating a linoleum cement containing an oxidized and polymerized siccative oil-resin complex which comprises admixing a filler with said cement while at a temperature of approximately 220° F. to 240° F., contacting the resulting mixture with a low boiling hydrocarbon solvent for the fraction comprised chiefly of the unoxidized and nonhardening constituents of said cement, separating the resulting solution, contacting the remaining mixture with an ether solvent for the oxidized but uncoagulated constituents of said cement, separating the resulting solution, and recovering as a residue the completely oxidized and polymerized portion of said cement, said ether solvent being at least one of the group consisting of ethyl ether, propyl ether, and isopropyl ether.

2. A process of obtaining valuable plastic material from linoleum cement which comprises admixing a filler with said linoleum cement while at an elevated temperature of about 220° F. to 240° F., extracting from said cement by means of a low boiling hydrocarbon solvent a fraction comprised chiefly of the unoxidized and nonhardening constituents of said cement, separating said extract, contacting the residue from said first extraction with a lower aliphatic ether solvent for the oxidized but uncoagulated constituents of said cement, and separating the remaining residue including the completely oxidized and polymerized portion of said cement from said second extraction.

3. A method of making the valuable plastic material which comprises subjecting a mixture of a siccative oil and a resin to the action of an oxygen containing gas while agitating said mixture at a temperature between about 160° F. and 260° F. to form linoleum cement containing oxidized and polymerized siccative oil-resin complex withdrawing said linoleum cement from the oxidizing zone and admixing a filler therewith while said cement is at a temperature of about 220° F. to 240° F., passing a low boiling hydrocarbon solvent through said cement filler mixture to extract therefrom the fraction comprised chiefly of the unoxidized and nonhardening constituents of said cement, separating said extract, passing through the remaining mixture a lower aliphatic ether solvent to extract therefrom the oxidized but uncoagulated constituents of said cement, separating said last-named extract, and recovering as a residue from said extractions the completely oxidized and polymerized portion of said cement admixed with said filler.

4. A method of fractionating a linoleum cement resulting from the oxidation of a mixture of a siccative oil and a resin at a temperature of approximately 160° F. to 260° F. which comprises admixing a filler with said linoleum cement while at a temperature of about 220° F. to 240° F., contacting the resulting filler cement mixture with a low boiling hydrocarbon to extract therefrom the fraction comprised chiefly of the unoxidized and nonhardening constituents of said cement, separating said extract, contacting the remaining mixture with at least one ether of the group consisting of ethyl ether, propyl ether, and isopropyl ether to extract therefrom the oxidized but uncoagulated constituents of said cement, separating said last-named extract, and recovering as the residue from said extractions a mixture comprising the completely oxidized and polymerized portion of said cement and said filler.

5. A method of extracting plastic material from linoleum cement which comprises admixing said linoleum cement while at a temperature of about 240° F. to 260° F. with a filler, extracting the fraction of said cement comprised chiefly of the unoxidized and nonhardening constituents thereof with petroleum ether boiling in the range of 30° C. to 75° C., separating said extract, extracting the oxidized but uncoagulated constituents from the remaining mixture by means of ethyl ether, separating said last-named extract, and recovering as a residue a mixture comprising the completely oxidized and polymerized portion of said cement and said filler.

HAROLD A. REEHLING.

REFERENCES CITED

The following references are of record in the file of this patent:

UNITED STATES PATENTS

| Number | Name | Date |
| --- | --- | --- |
| 2,050,646 | Bonney et al. | Aug. 11, 1936 |
| 2,224,238 | Spitzli et al. | Dec. 10, 1940 |

FOREIGN PATENTS

| Number | Country | Date |
| --- | --- | --- |
| 242,832 | Great Britain | Nov. 19, 1925 |

Certificate of Correction

Patent No. 2,515,265   July 18, 1950

HAROLD A. REEHLING

It is hereby certified that error appears in the printed specification of the above numbered patent requiring correction as follows:

Column 5, line 21, for "45° whiting" read *45% whiting*; line 27, for the word "produce" read *product*;
and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*